(12) United States Patent
McCullen (10) Patent No.: US 7,475,379 B2
(45) Date of Patent: Jan. 6, 2009

(54) METHODS AND SYSTEMS FOR LAYOUT AND ROUTING USING ALTERNATING APERTURE PHASE SHIFT MASKS

(75) Inventor: Kevin W. McCullen, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 692 days.

(21) Appl. No.: 10/710,165

(22) Filed: Jun. 23, 2004

(65) Prior Publication Data

US 2005/0287443 A1    Dec. 29, 2005

(51) Int. Cl.
G06F 17/50 (2006.01)
G03C 5/00 (2006.01)
G03F 1/00 (2006.01)

(52) U.S. Cl. .............................. 716/19; 716/13; 716/20; 716/21; 430/5; 430/30

(58) Field of Classification Search ...................... 716/2, 716/5, 8, 10, 19–21; 703/13; 438/725; 430/5, 430/30

See application file for complete search history.

(56) References Cited

U.S. PATENT DOCUMENTS

| | | | |
|---|---|---|---|
| 6,453,452 B1 * | 9/2002 | Chang et al. ..................... 716/8 |
| 6,721,938 B2 * | 4/2004 | Pierrat et al. ..................... 716/19 |
| 6,757,645 B2 * | 6/2004 | Chang et al. ..................... 703/13 |
| 6,757,886 B2 * | 6/2004 | Liebmann et al. ............... 716/19 |
| 6,785,879 B2 * | 8/2004 | Pierrat .......................... 716/21 |
| 6,787,271 B2 * | 9/2004 | Cote et al. ...................... 430/5 |
| 6,901,575 B2 * | 5/2005 | Wu et al. ........................ 716/19 |
| 6,901,576 B2 * | 5/2005 | Liebmann et al. ............... 716/19 |
| 7,003,757 B2 * | 2/2006 | Pierrat et al. ..................... 716/19 |
| 7,028,285 B2 * | 4/2006 | Cote et al. ...................... 716/21 |
| 7,143,390 B2 * | 11/2006 | Moukara ....................... 716/21 |
| 7,155,689 B2 * | 12/2006 | Pierrat et al. ..................... 716/4 |
| 7,169,515 B2 * | 1/2007 | Pierrat et al. ..................... 430/5 |
| 7,194,704 B2 * | 3/2007 | Kotani et al. .................... 716/2 |
| 7,247,574 B2 * | 7/2007 | Broeke et al. ................. 438/725 |
| 7,281,226 B2 * | 10/2007 | Wu et al. ........................ 716/10 |
| 2003/0165749 A1 * | 9/2003 | Fritze et al. ..................... 430/5 |
| 2005/0142470 A1 * | 6/2005 | Socha et al. .................... 430/30 |
| 2005/0166175 A1 * | 7/2005 | Liebmann et al. .............. 716/21 |
| 2006/0040188 A1 * | 2/2006 | Liebmann et al. .............. 430/5 |
| 2007/0101303 A1 * | 5/2007 | Lien et al. ....................... 716/5 |
| 2007/0174803 A1 * | 7/2007 | Lien et al. ....................... 716/12 |

OTHER PUBLICATIONS

Kahng et al.; "New graph bipartizations for double-exposure, bright field alternating phase-shift mask layout"; Jan. 30-Feb. 2, 2001; Design Automation Conference, 2001. Proceedings of the ASP-DAC 2001. Asia and South Pacific; pp. 133-138.*

(Continued)

*Primary Examiner*—Helen Rossoshek
(74) *Attorney, Agent, or Firm*—Richard M. Kotulak; Greenblum & Bernstein P.L.C.

(57) ABSTRACT

Methods for performing phase-correct layout and routing of integrated circuits using alternating aperture phase shift masks (AltPSM), including bright field AltPSM and dark field AltPSM are disclosed. Also disclosed are systems for performing phase-correct layout and routing, including computer-based routing programs and systems.

9 Claims, 10 Drawing Sheets

OTHER PUBLICATIONS

Nakao et al.; "Measuring Odd Component Of Aberration Function Utilizing Alternating PSM"; Jul. 13-16, 1998; Microprocesses and Nanotechnology Conference, 1998 International; pp. 109-110.*

Levenson et al.; "A new PSM system: SCAAM with Phase Phirst!"; Oct. 31-Nov. 2, 2001; Microprocesses and Nanotechnology Conference, 2001 International; pp. 8-9.*

Liebmann et al.; "Enabling alternating phase shifted mask designs for a full logic gate level: design rules and design rule checking"; 2001; Design Automation Conference, 2001. Proceedings; pp. 79-84.*

Ghosh et al.; "New DFM approach abstracts altPSM lithography requirements for sub-100 nm IC design domains"; Mar. 24-26, 2003; Quality Electronic Design, 2003. Proceedings. Fourth International Symposium on; pp. 131-137.*

Sanie et al.; " Practical application of full-feature alternating phase-shifting technology for a phase-aware standard-cell design flow"; 2001; Design Automation Conference, 2001. Proceedings; pp. 93-96.*

Yi-ling et al.; "Interface method to fabricate phase shifter of alternate phase shifting mask"; Sep. 26-28, 2000; Semiconductor Manufacturing, 2000. Proceedings of ISSM 2000. The Ninth International Symposium on; pp. 423-425.*

McCullen, K.; "Phase correct routing for alternating phase shift masks"; 2004; Design Automation Conference; Proceedings. 41st; pp. 317-320.*

Smith et al.; "Comparison of electrical and SEM CD measurements on binary and alternating aperture phase-shifting masks"; May 2003; Semiconductor Manufacturing, IEEE Transactions on; vol. 16, Issue 2, pp. 266-272.*

Berman et al.; "Optimal phase conflict removal for layout of dark field alternating phase shifting masks"; Feb. 2000;□□Computer-Aided Design of Integrated Circuits and Systems, IEEE Transactions on; vol. 19, issue 2, pp. 175-187.*

Leung, H. "Advanced Routing in Changing Technology Landscape," Presented at Association for Computing Machinery 2003 Symposium on Physical Design, Apr. 6-9, 2003, pp. 118-121.

Liebmann, L. "Layout Impact of Resolution Enhancement Techniques: Impediment or Opportunity?" Presented at Association for Computing Machinery 2003 Symposium on Physical Design, Apr. 6-9, 2003, pp. 110-117.

Wong, Alfred Kwok-Kit. *Resolution Enhancement Techniques in Optical Lithography*. SPIE Press, 2001 (pp. 131-133).

Sherwani, N, *Algorithms For VLSI Physical Design Automation*. Kluwer Press, 1999 (pp. 237-244).

* cited by examiner

METHODS AND SYSTEMS FOR LAYOUT AND ROUTING USING ALTERNATING APERTURE PHASE SHIFT MASKS

BACKGROUND OF INVENTION

1. Field of the Invention

The invention relates to methods and systems for design, layout, and routing of integrated circuits using alternating aperture phase shift masks.

2. Description of Related Art

The features of small integrated circuit semiconductor devices, such as microprocessors, are usually defined by using lithographic techniques on a semiconductor wafer. A typical lithographic mask for semiconductor photolithography processes is a sheet of quartz onto which a layer of chrome or another opaque material is deposited in patterns that define the shapes which are to be reproduced lithographically on the semiconductor wafer.

As better technologies have allowed the features of a semiconductor device to become smaller and smaller, feature size has begun to approach the theoretical minimum size that can be faithfully reproduced by conventional lithographic techniques. Therefore, as feature sizes have become smaller and smaller, engineers have turned to a number of Resolution Enhancement Techniques (RET) that improve the resolution of the conventional processes.

One RET is a technique known as Alternating Aperture Phase Shift Masks (AltPSM). In general, AltPSM makes use of the constructive and destructive interference of light to sharpen the edges and increase the resolution of lithographically reproduced features. Specifically, some portions of AltPSM masks are etched so as to be thinner, or have additional layers of transparent material deposited on them so as to be thicker. Changing the depth of material through which light passes during lithography alters the phase of the light. By selecting and controlling the depth (i.e., thickness) of the mask, an AltPSM mask can have areas in which the light passing through the mask is 180° out of phase with respect to the other areas of the same mask. When light that is 180° out of phase meets at the wafer, either constructive interference or destructive interference may occur, and the interfering light defines the pattern to which the (usually photoresist-covered) wafer is actually exposed. Typically, light of a particular wavelength (e.g., currently 193 nanometers (nm)) is used in semiconductor lithography. Resolution Enhancement Techniques such as AltPSM may be used to print features smaller than the wavelength of the light.

When using AltPSM techniques in integrated circuit design and layout, features that approach the minimum size may be defined, at least in part, by shapes having the phases necessary to cause interference and create the desired feature. Two primary types of AltPSM are in use: bright field and dark field. The two techniques are complements of one another. In bright field AltPSM, phase shifting shapes are added to the layout to sharpen the focus of the design features. In dark field AltPSM, phases are added to the design features themselves to define and sharpen the spaces between the features.

Figure 1:
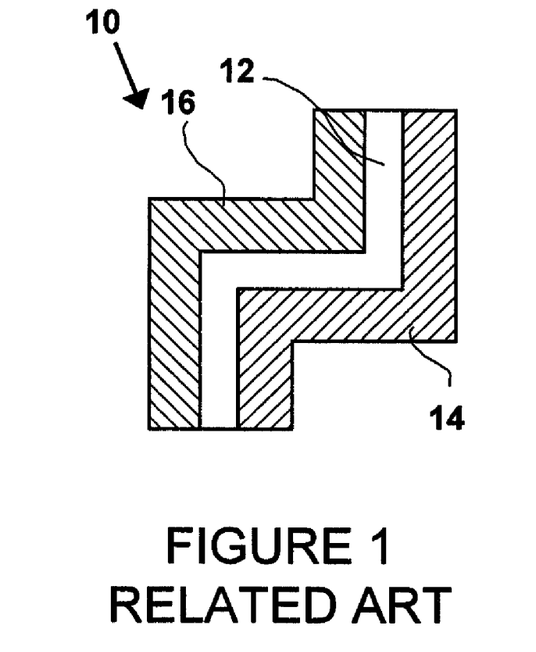
FIG. 1 is a schematic view of an exemplary conventional bright field AltPSM layout.

For example, FIG. 1 is a depiction of an exemplary phase-correct bright field AltPSM layout 10. The actual shape of the feature 12 is flanked on each side by a phase shape 14, 16. The two phase shapes 14, 16 have phases that are 180° out of phase, so that interference of light will define the desired feature 12.

Figure 2:
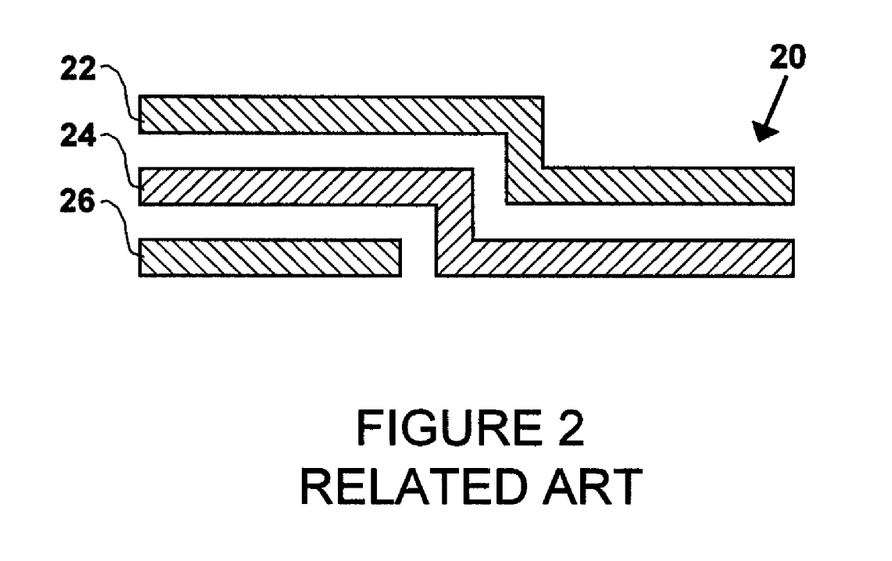
FIG. 2 is a schematic view of an exemplary conventional dark field AltPSM layout.

FIG. 2 is a depiction of an exemplary phase-correct dark field AltPSM layout 20. In the dark field layout 20, three wires 22, 24, 26 are given particular phases; the uppermost and lowermost phase wires 22, 26 in FIG. 2 have the same phase, and the center wire 24 has a phase 180° out of phase with the other two wires 22, 26; therefore interference between the center wire 24 and the top and bottom wires 22, 26 will define and sharpen the spaces between the wires.

Typically, bright field AltPSM is used for polysilicon layers and dark field AltPSM is used for metal layers (e.g., wiring layers). The overall process of determining the location and phase of AltPSM phase shapes is sometimes referred to as "phase coloring," particularly in the case of dark field AltPSM, in which phases are added to existing shapes or features. AltPSM layouts and routings may be determined for an entire integrated circuit together, or for smaller individual portions of the circuit, for example, between a certain group of standard or "book" elements in one portion of the integrated circuit.

SUMMARY OF INVENTION

One aspect of the invention relates to a method for laying out features for alternating aperture phase shift masks. The method comprises defining features on a grid of a uniform basic pitch. The method also comprises orienting the features such that those of the features defined, at least in part, by phase shifting shapes are oriented along a primary direction, and spacing two features terminating adjacent one another such that the two features have space between them sufficient to prevent phase conflicts if both of the two features are defined, at least in part, by phase shifting shapes.

Another aspect of the invention relates to a system for layout and routing of integrated circuits. The system comprises a routing module that, when routing wires or features for alternating aperture phase shift masks, considers routes essentially only in a primary wiring direction, and blocks sufficient free space between the end of a first feature and the beginning of a second feature to avoid phase conflicts between the first feature and the second feature.

A further aspect of the invention relates to a computer-readable medium containing instructions that, when executed, cause a computer to produce a substantially phase-correct circuit routing for a plurality of features defined by alternating aperture phase shift masks.

BRIEF DESCRIPTION OF DRAWINGS

The invention will be described with respect to the following drawing figures, in which like numerals represent like views throughout the figures, and in which.

DETAILED DESCRIPTION

In general, embodiments of the invention provide methods and systems for designing and laying out integrated circuits using AltPSM techniques. Methods and systems according to embodiments of the invention may be used with and embodied in automated programs that create wiring layouts and routes, as well as with manual layout and routing techniques.

The use of phase shapes or design shapes having particular phases may create certain routing problems for wiring and other features in AltPSM layout and routing. The description below presents certain particular examples of these problems, along with design principles and alternative routing layouts for avoiding the problems in systems and methods according to embodiments of the invention, for both bright field and dark field AltPSM.

Figure 3A:
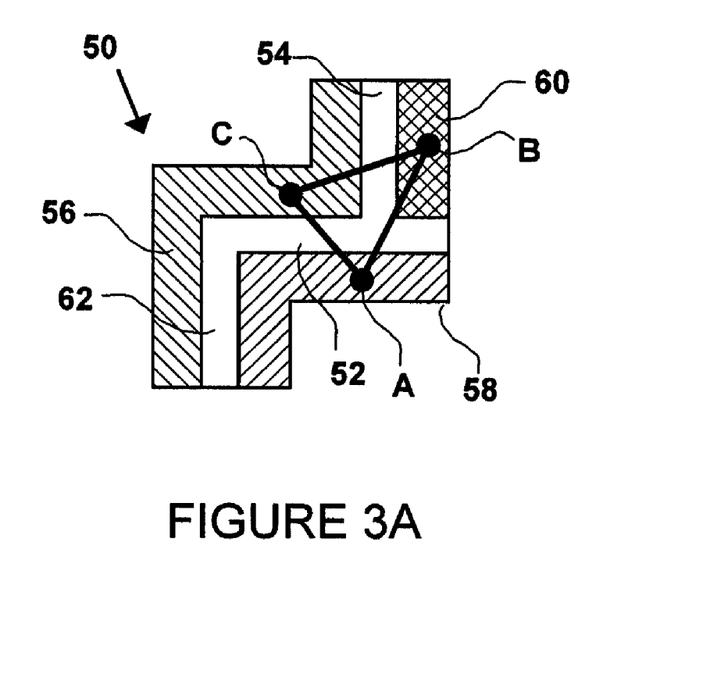
FIG. 3A is a schematic view of a bright field AltPSM layout illustrating a "T" conflict created by the intersection of two orthogonal features.

FIG. 3A is a schematic view of a bright field AltPSM layout 50 illustrating a "T" conflict created by the intersection of orthogonal wires 52, 54, 62. Wires 54 and 62 run vertically (with respect to the coordinate system of the figure); feature 52 runs horizontally. Three phase shapes 56, 58, and 60 flank the three orthogonal wires 52, 54, 62. Phase shapes 56 and 58 are 180° out of phase with each other and will thus create the interference necessary to define wires properly. However, phase shape 60 is not 180° out of phase with both of the other phase shapes 56, 58; therefore, some portion of the orthogonal wires 52, 54, 62 will be malformed or unsharp because two mutually 180° out of phase shapes are not present to define each feature 52, 54, 62. The three points A, B, C in FIG. 3A, and the lines between them, illustrate the improper odd cycle (i.e., the phase pairings that improperly occur between the three phase shapes 56, 58, 60).

In embodiments of the invention, the wiring on each metallization layer is designed to run in a primary wiring direction. Additionally, a layout grid having some uniform basic pitch, or spacing between features, is defined. As the term is used here, a "standardized" or "uniform" grid or basic pitch may refer to a grid with a uniform pitch or spacing in all directions or a uniform pitch in only a single direction. (However, for simplicity in description, embodiments of the invention will be described with respect to spacing grids that are uniform in all directions.) Typically, because of general integrated circuit design requirements, some or all of the wires or features on each metallization layer would be designated as "critical," or those that will be fabricated with specified dimensions. In typical integrated circuit designs, "critical" wires or features are fabricated with the minimum possible dimensions or spacings, although this need not necessarily be the case. A wire or feature may be designated as "critical" for a number of reasons, all of which would be readily discerned by those of skill in the art. Typically, "critical" features are those that have at least one dimension equal to a single space on the grid (e.g., a feature width of one grid space). Features that are "non-critical" are typically those that have dimensions occupying more than one space on the grid (e.g., a feature width of two or more grid spaces).

Two design principles according to embodiments of the invention may avoid conflicts such as that shown in FIG. 3A, given the circuit layout design practices described above. The first design principle is that wires and features that run in the primary wiring direction should be on a uniform pitch and may or may not be designated as "critical," depending on the particular circuit. The second design principle is that wires running orthogonal to the primary wiring direction should be designated as "non-critical" and given larger dimensions (e.g., dimensions that would not require phase shapes or phase coloring).

Figure 3B:
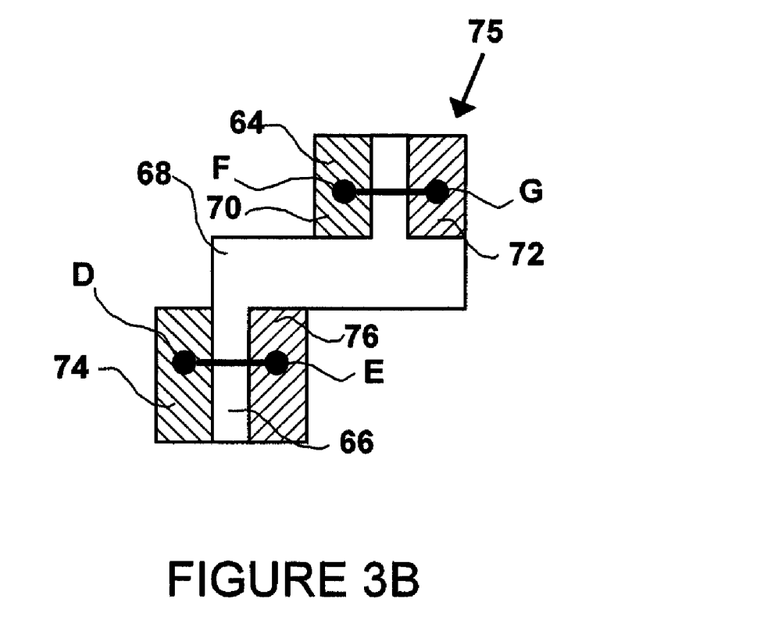
FIG. 3B is a schematic view of a bright field AltPSM layout similar to that of FIG. 3A, illustrating the avoidance of a "T" conflict using methods according to embodiments of the invention.

FIG. 3B is a schematic view of a bright field AltPSM layout 75 similar to that of FIG. 3A, illustrating the avoidance of the phase conflict shown in FIG. 3A by application of the two design principles described above. In the case of FIGS. 3A and 3B, the primary wiring direction is vertical (with respect to the coordinate system of those figures). In FIG. 3B, as in FIG. 3A, two wires 64, 66 run in the vertical direction. A third wire 68 runs orthogonally (i.e., horizontally) with respect to the other two wires 64, 66 to connect them. By the second of the two design principles described above, the orthogonal wire 68 is "non-critical," has dimensions larger than the two vertical wires 64, 66, and does not require phase shapes. Properly paired phase shapes 70, 72, 74, 76 flank the two vertical wires 64, 66, respectively. (Points D, E, F, G and the lines between them illustrate proper pairings between the phase shapes 70, 72, 74, 76.) Note that by the first design principle described above, the two vertical wires 64, 66 may be of either "critical" or "non-critical" dimensions, although they are illustrated as being of "critical" dimensions in FIG. 3B.

Figure 4A:
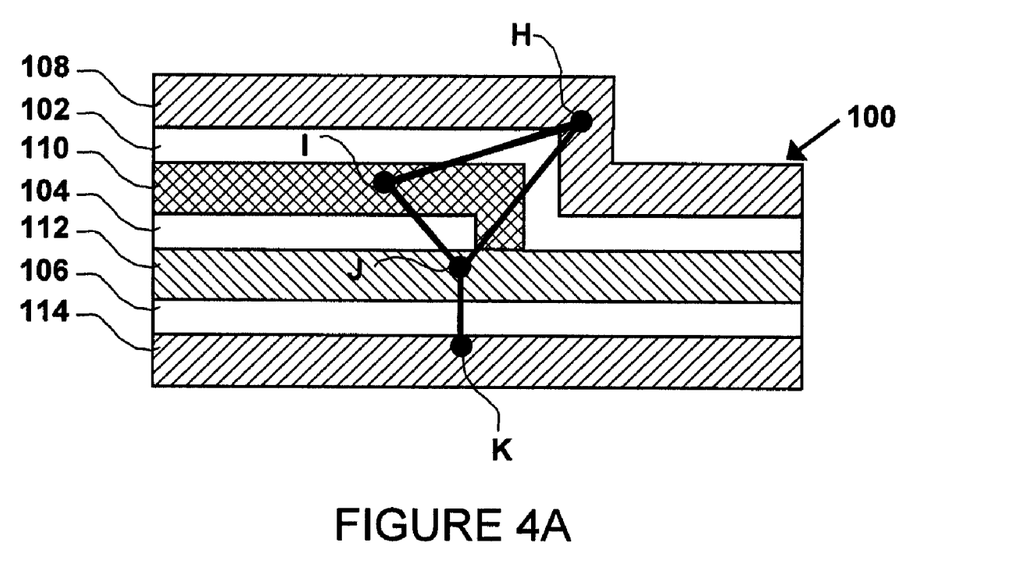
FIG. 4A is a schematic view of a bright field AltPSM layout illustrating an "odd/even" conflict created by several nearby features, one of which changes direction.
Figure 4B:
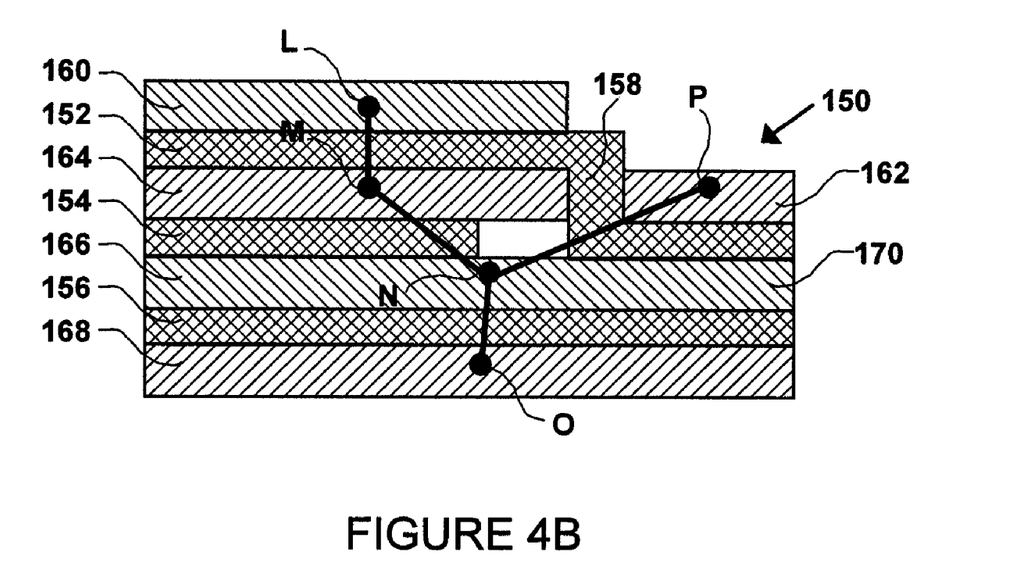
FIG. 4B is a schematic view of a bright field AltPSM layout similar to that of FIG. 4A illustrating the avoidance of an "odd/even" conflict using methods according to embodiments of the invention.

FIG. 4A is a schematic view of a bright-field AltPSM layout 100 illustrating an "odd-even" conflict. As shown, the AltPSM layout 100 includes three wires, 102, 104, 106. Top wire 102 turns downward approximately when the middle wire 104 terminates. (The change in direction of top wire 102 may also be referred to as a "jog," and certain considerations relating to jogs in methods according to embodiments of the invention will be described below in more detail.) The bottom wire 106 continues straight through AltPSM layout 100. Phase shapes 108 and 110 flank the top wire 102, phase shapes 110 and 112 flank the middle wire 104, and phase shapes 112 and 114 flank the bottom wire 106. By the nature and general principles of AltPSM layout, the middle wire 104 should be flanked with phase shapes along its entire length. However, by another general principle of AltPSM layout, the phase shapes used for the top wire 102 should remain consistent along the entire length of the top wire 102. Therefore, a conflict arises because of phase shapes 110 and 112, as shown by points H, I, J, K and the lines between them. (Points H, I, and J define an "odd cycle.") FIG. 4B is a schematic view of a bright field AltPSM layout 150 similar to that of FIG. 4A, illustrating the avoidance of an "odd-even" conflict using the design principles described above. AltPSM layout 150 also includes three wires: a top wire 152, a middle wire 154, and a bottom wire 156. The three wires 152, 154, 156 have generally the same configuration as the corresponding wires 102, 104, 106 of FIG. 4A. However, in FIG. 4B, by the second of the two design principles described above, the orthogonal section 158 of the top wire 152 has been designated as "non-critical" and has been widened accordingly (in this case, to double the "critical" width). Because the orthogonal section 158 has been widened and is "non-critical," there is no need for flanking phase shapes, and the conflict is thus resolved.

Figure 5A:
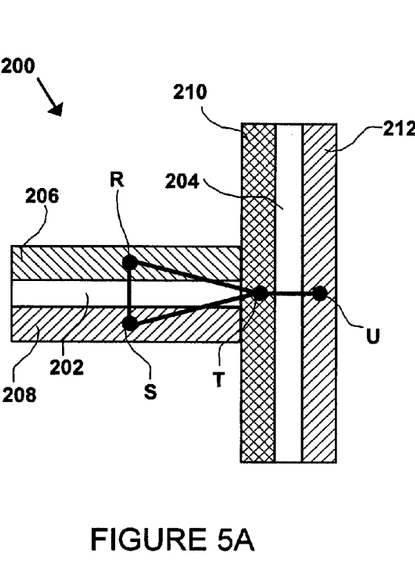
FIG. 5A is a schematic view of a bright field AltPSM layout illustrating a "line end" conflict created by the end of one feature proximate to another feature.

Phase shapes 160 and 162 flank the upper portion of top wire 152, while phase shapes 164 and 170 flank the bottom portion of top wire 152. (Phase shapes 162 and 164 have the same phase, which is 180° out of phase with that of phase shape 160. The phase of phase shape 170 is the same as that of phase shape 160.) Phase shapes 164 and 166 flank the middle wire 154 and are mutually 180° out of phase. Phase shapes 166 and 170 have the same phase and flank the top of bottom wire 156, while phase shape 168 flanks the bottom of bottom wire 156. (Points L, M, N, O, P and the lines between them illustrate the corrected phase pairings.) FIG. 5A is a schematic view of an AltPSM layout 200 illustrating a "line end" conflict created by the end of one feature proximate to another. A horizontal wire 202 and a vertical wire 204 are shown in FIG. 5A. Horizontal wire 202 is flanked by phase shapes 206 and 208; vertical wire 204 is flanked by phase shapes 210 and 212. Because of the proximity of the horizontal 202 and vertical 204 wires, a phase conflict arises between phase shapes 206, 208 and 210, as shown by points R, S, T, U and the lines between them.

Figure 5B:
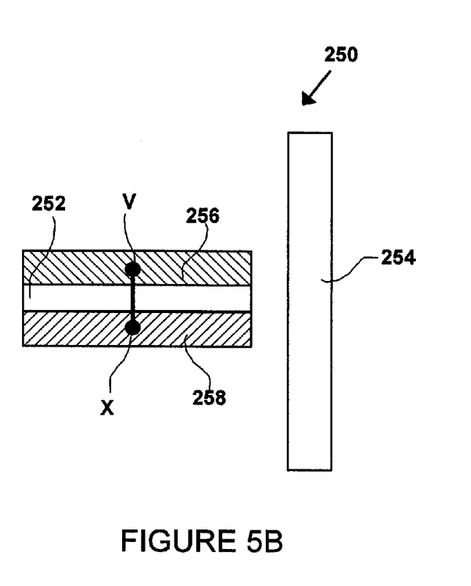
FIG. 5B is a schematic view of a bright field AltPSM layout illustrating the avoidance of a "line end" conflict using methods according to embodiments of the invention.
Figure 6A:
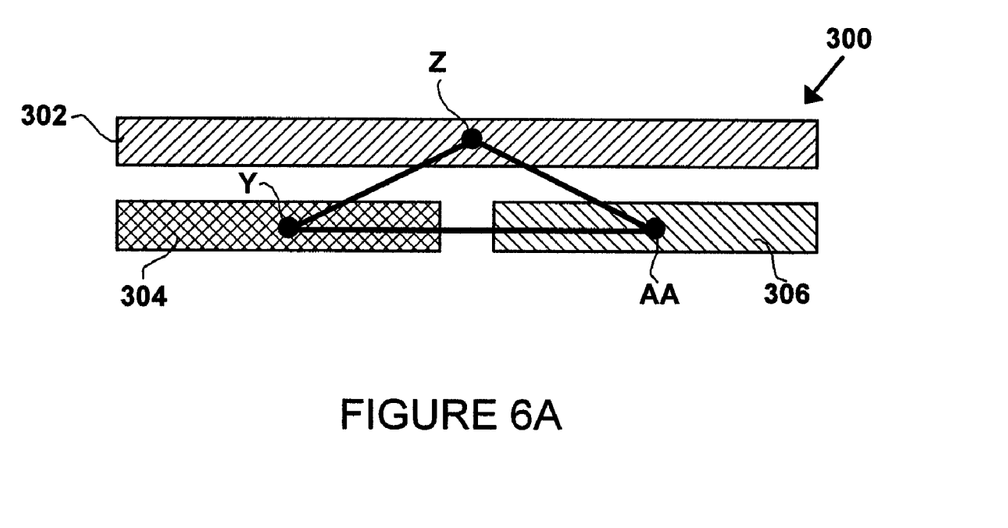
FIG. 6A is a schematic view of a dark field AltPSM layout illustrating a "T" conflict.

FIG. 5B is a schematic view of an AltPSM layout 250 illustrating the avoidance of a "line end" conflict. As shown in FIG. 5B, AltPSM layout 250 includes a horizontal wire 252 and a vertical wire 254. By the second of the two deprinciples sign described above, assuming the primary wiring direction on the metallization layer is horizontal, the vertical wire 254 has been made "non-critical" and, accordingly, has been given a greater width so that flanking phase shapes are not required. Horizontal wire 252 is flanked by phase shapes 256 and 258, which are mutually 180° out of phase. (The correctness of the phase pairing is shown by points V and X and the line between them.) For dark-field wire routing and AltPSM phase shapes, three specific design principles may apply in methods according to embodiments of the invention. First, all wiring and other features in a dark field AltPSM routing layout should run in the primary wiring direction. In the case of dark field AltPSM, wires and other features orthogonal to the primary wiring direction should generally be avoided. Second, where a wire or feature ends, additional space should be inserted beyond the edge of the wire or feature, for example, doubling the free space between the end of one wire or feature and the beginning of another. A third design principle, which flows from the second principle, is that pins should not be aligned in the primary wiring direction at minimum spacing, because two such pins aligned at minimum spacing are likely to cause violations of the second design principle. (Pins and their layout in methods according to embodiments of the invention will be described below in more detail.) FIG. 6A is a schematic view of a portion of a dark field AltPSM layout, generally indicated at 300, illustrating a "T" conflict. In layout 300, three wires 302, 304, 306 are given phases. Wire 302 runs horizontally through layout 300. Wire 304, immediately below wire 302, terminates midway through layout 300, and wire 306 begins a short distance after the end of phase shape 304. Wires 302 and 306 are mutually 180° out of phase with each other, and will thus properly define wires; however, phase shape 304 is not 180° out of phase with either of wires 302 or 306. Therefore, wire 304 will not properly define the spaces between the wires 302, 304, 306 in combination with the other two wires 302, 306. (The odd cycle is shown by points Y, Z, and AA, and the lines between them.) In general, the need for wires 302, 304, 306 of three different phases is created by the spacing between the end of wire 304 and the beginning of wire 306.

Figure 6B:
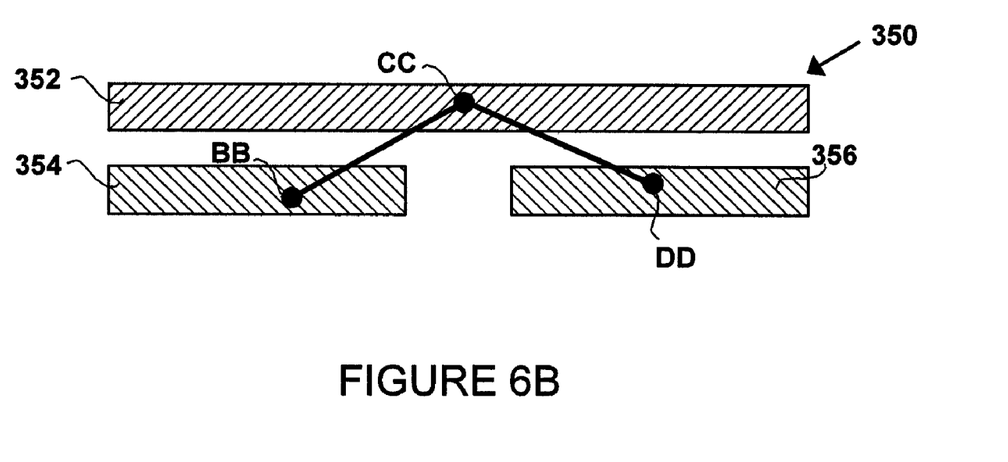
FIG. 6B is a schematic view of a dark field AltPSM layout illustrating the avoidance of a "T" conflict using methods according to embodiments of the invention.

FIG. 6B is a schematic view of a dark field AltPSM layout 350, illustrating the avoidance of a "T" conflict using methods according to embodiments of the invention. Layout 350 includes three wires 352, 354, 356 with phases. Similarly to layout 300, wire 352 runs horizontally through layout 350. Wire 354, below wire 352, terminates approximately mid-way through layout 350, and wire 356 begins a short distance after the end of wire 304. However, by the second design principle for dark field AltPSM, in layout 350, extra space has been inserted between the respective ends of wires 354 and 356, approximately doubling the amount of space between them. The particular amount of space may vary, but would generally be enough space to render the space between the features "non-critical" in dimension. Accordingly, the conflict is eliminated; wires 354 and 356 are mutually 180° out of phase with wire 352. The proper phase pairings are shown by points BB, CC, and DD and the lines between them.

Figure 7A:
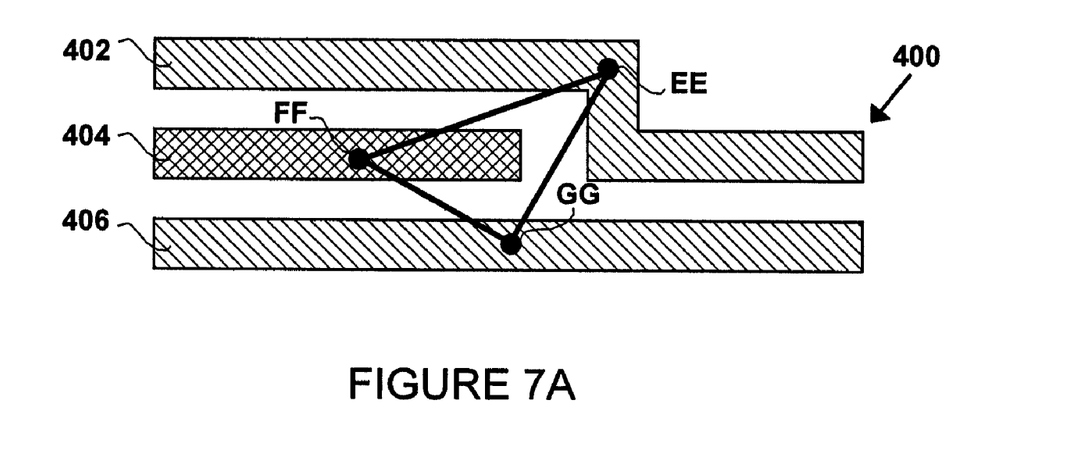
FIG. 7A is a schematic view of a dark field AltPSM layout illustrating an "odd/even" conflict.

FIG. 7A is a schematic view of a dark field AltPSM layout 400, illustrating an "odd-even" conflict. Layout 400 has three wires 402, 404, 406 with phases. Top wire 402 extends the entire length of layout 400 but includes a jog and changes direction downward approximately mid-way through layout 400 before changing direction again and resuming its horizontal course. Wire 404 extends to a point approximately mid-way through layout 400 and terminates. Wire 406 extends horizontally along the entire length of layout 400. The jog of wire 402 creates a phase conflict between wire 404 and the other two wires 402, 406. The phase conflict is shown by points EE, FF, and GG and the lines between them.

Figure 7B:
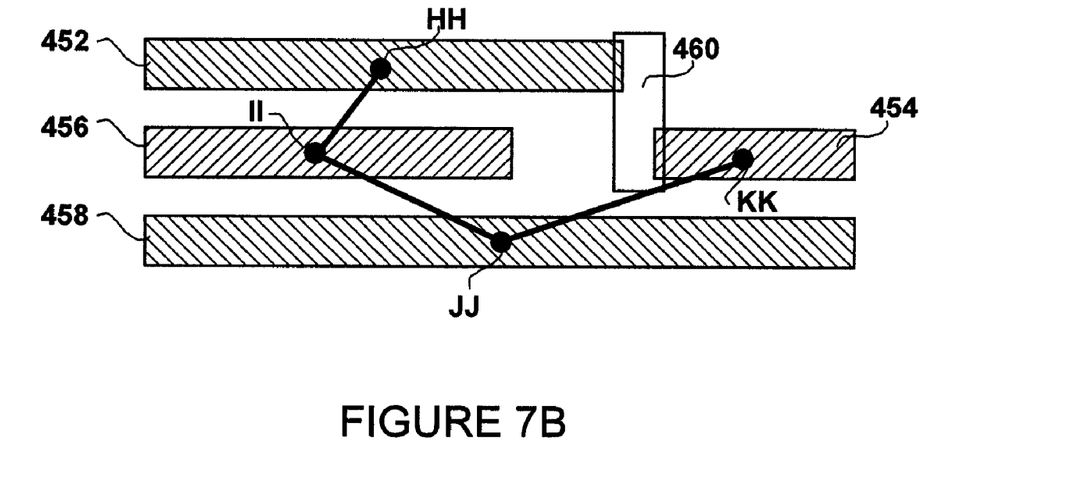
FIG. 7B is a schematic view of a dark field AltPSM layout illustrating the avoidance of an "odd/even" conflict using methods according to embodiments of the invention.

FIG. 7B is a schematic view of a dark field AltPSM layout 450, illustrating the avoidance of an "odd-even" conflict using methods according to embodiments of the invention. Layout 450 includes four wires 452, 454, 456, 458 with phases. Wires 452 and 454 traverse essentially the same route as wire 402 of layout 400. However, neither of wires 452 or 454 includes a jog; both wires 452, 454 extend horizontally. By the first design principle for dark field AltPSM routing and layout, the sections of wiring orthogonal to the primary wiring direction (the primary wiring direction being horizontal in the case of FIG. 7B) have been moved to another metallization layer. Wires 452 and 454 are connected at respective ends to a structure 460 that is in electrical communication with another metallization layer on which vertical is the primary wiring direction. The correct phase pairings are shown by points HH, II, JJ, and KK and the lines between them.

As was described above particularly with respect to wire 102 and wire 402, jogs or changes in direction of features may cause routing and phase conflicts among AltPSM phase shapes and phase-colored features. However, it should be understood that not all jogs will cause phase conflicts. In particular, if an AltPSM layout is performed on a standardized pitch or grid, then jogs that run for an even number of grid spaces may not cause phase or routing conflicts if proper spacing is maintained between the jogged portion of the wire and other wires it passes (applying the second principle of dark field AltPSM routing and layout between wire ends and the jogged wire section).

Figure 8:
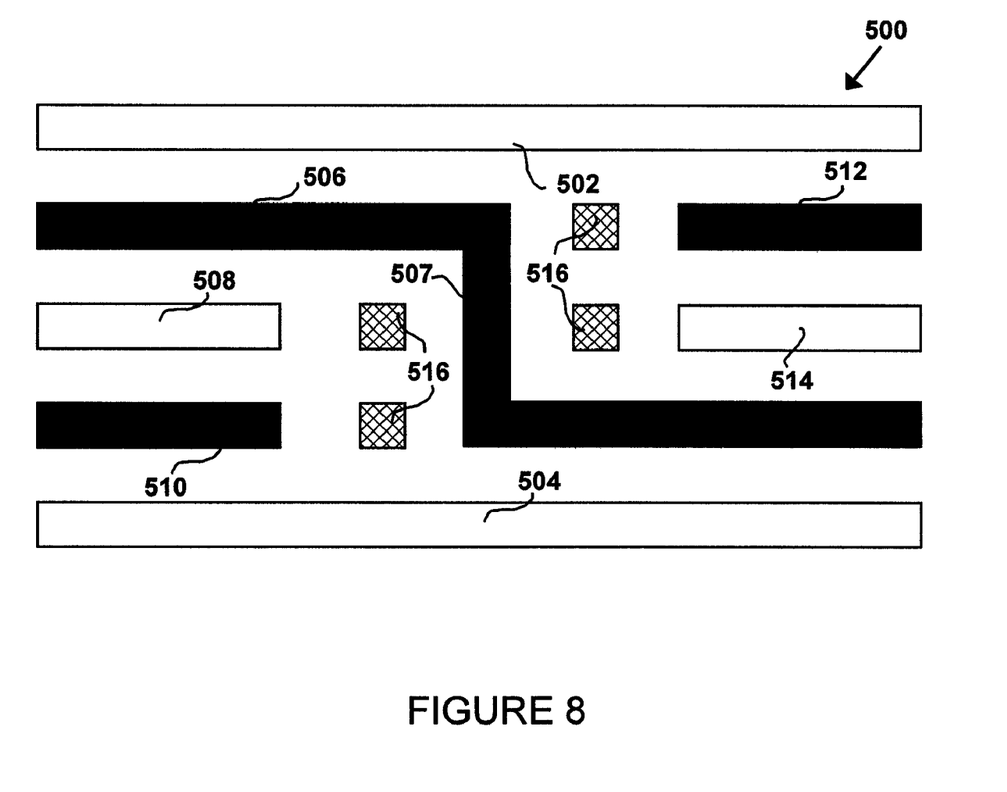
FIG. 8 is a schematic view of a dark field AltPSM layout illustrating a phase correct even jog that may be used in methods according to embodiments of the invention.

FIG. 8 is a schematic view of a dark field AltPSM layout 500. Layout 500 includes phase-colored wires 502 and 504. Below wire 504 in layout 500 is wire 506, which begins on the upper left of layout 500 and jogs downward approximately mid-way through layout 500 to terminate on the lower right of layout 500. The phase of wires 502 and 506 are properly mutually 180° out of phase, as are wires 504 and 506. In addition to wires 502, 504, and 506, a number of smaller features populate layout 500. In particular, wires 508 and 510, which are properly mutually 180° out of phase, are to the left of jog 507 in wire 506. Wires 512 and 514, which are properly mutually 180° out of phase, are to the right of jog 507 in wire 506.

In addition to the wires, FIG. 8 includes four rectangular indicators 516 for illustrative purposes (i.e., the indicators 516 are not features in the layout). The indicators 516 indicate the pitch or grid size on which layout 500 is created. Additionally, the indicators 516 are positioned at points that should be left empty of features in order for no phase conflicts to arise. As can be seen by comparison to the indicators 516, the jog 507 in phase shape 506 extends for an even number of grid spaces, which, in general, prevents phase conflicts. Wires and phase shapes having more than one jog may avoid conflict in methods according to embodiments of the invention by following the general principle illustrated in FIG. 8 and extending the jog for an even number of grid spaces.

Figure 9A:
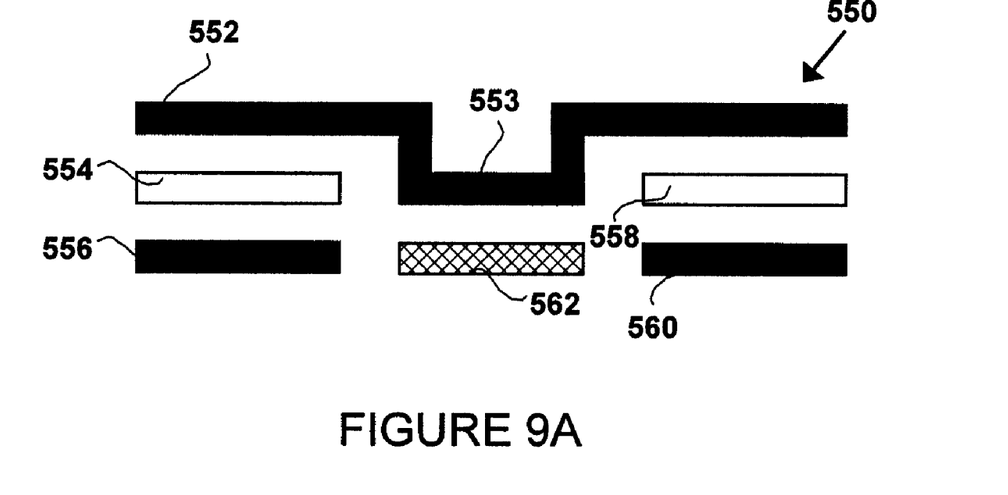
FIGS. 9A and 9B are schematic views of dark field AltPSM layouts illustrating phase correct odd jogs that may be used in embodiments of the invention.
Figure 9B:
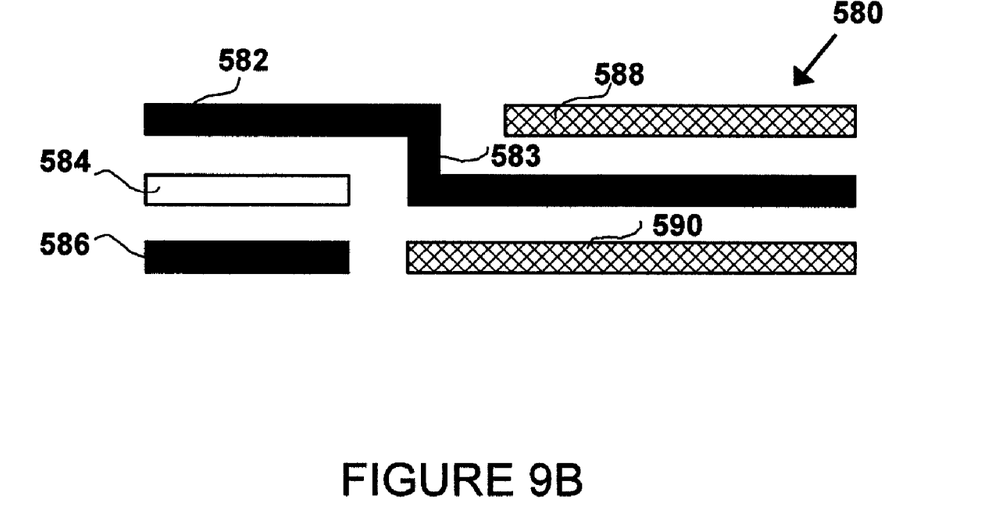

In some cases, wires or phase shapes may also jog for an odd number of grid spaces. FIGS. 9A and 9B are schematic views of dark field AltPSM layouts 550 and 580, respectively, which illustrate phase correct layouts with wires having jogs extending for an odd number of grid spaces. Wire 552 has a central, U-shaped jog 553. Smaller wires 554 and 556, which are correctly mutually 180° degrees out of phase, are located below wire 552 and to the left of jog 553. Wire 554 is also 180° out of phase with wire 552. Smaller wires 558 and 560, which are correctly mutually 180° degrees out of phase, are located below wire 552 and to the right of jog 553. Wire 558 is also 180° out of phase with wire 552. Jog 553 extends downward an odd number of grid spaces. Therefore, because of jog 553 in wire 552, area 562 should be left free of wires or other features in order to prevent phase conflicts.

Dark field AltPSM layout 580 of FIG. 9B illustrates a similar situation. Wire 582 has a downward jog 583, such that it begins in the upper left of layout 580 and terminates toward the lower right. Jog 583 extends an odd number of grid spaces. Shorter wires 584 and 586 extend below the upper left portion of wire 582 and are correctly mutually 180° out of phase with each other. Wire 584 is correctly 180° out of phase with wire 582. Because of the odd jog 583, areas 588 and 590 should be left free of wires or other features in order to prevent phase conflicts.

Figure 10A:
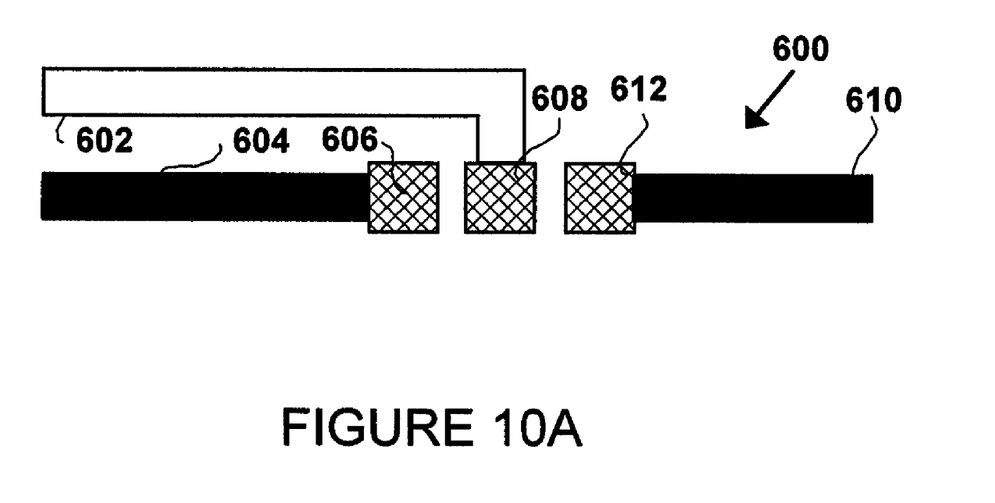
FIG. 10A is a schematic view of a dark field AltPSM layout illustrating phase correct phase shapes that terminate at pins according to embodiments of the invention.

Other situations can arise in dark field AltPSM when wires terminate at pins. FIG. 10A is a schematic view of a dark field AltPSM layout 600 illustrating one phase-correct way of terminating wires at pins. As shown in FIG. 9A, two phase-colored wires 604 and 610, which are not correctly mutually out of phase, terminate at respective pins 606 and 612. In order to avoid phase conflicts, a third wire 602 with a phase that is properly 180° out of phase with both wires 604 and 610, jogs in and terminates at a pin 608 that is interposed between pins 606 and 612. This arrangement represents a special case, because of the jog of third wire 602.

Figure 10B:
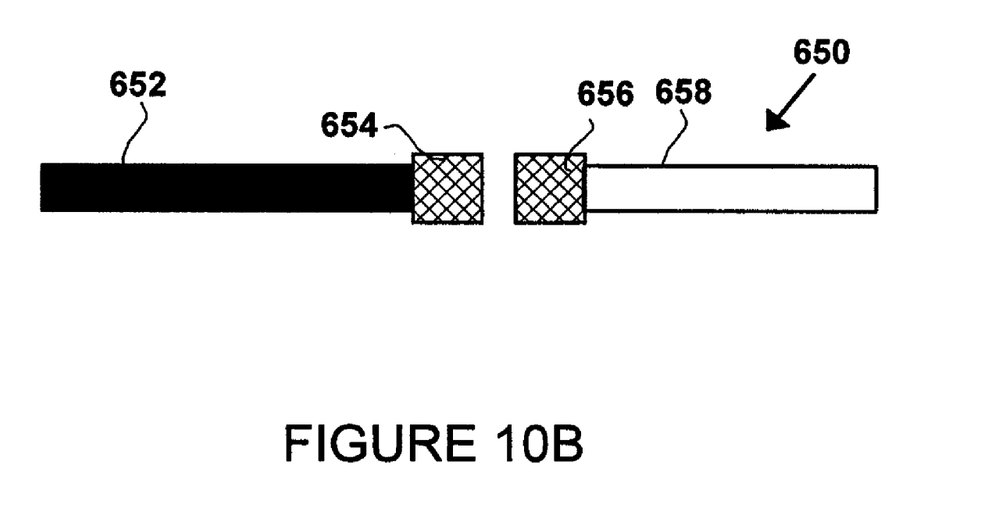
FIG. 10B is a schematic view of a dark field AltPSM layout illustrating phase correct phase shapes that terminate at pins according to embodiments of the invention.

As an alternative to layout 600, FIG. 10B is a schematic view of a dark field AltPSM layout 650 which illustrates two horizontal wires 652 and 658 that terminate at respective pins 654 and 656. The wires 652, 658 are properly mutually 180° out of phase, preventing a phase conflict.

The AltPSM layouts described above with respect to FIGS. 3A-10B illustrate representative routing and phase conflicts in bright field and dark field AltPSM, respectively, and exemplary methods of resolving those conflicts using methods and systems according to embodiments of the invention. It should be understood that the examples presented above may not be the only types of conflicts that may arise in AltPSM layout. However, certain types of more complex conflicts may be analyzed as being combinations of the basic types of conflicts that were described above.

Some additional difficulties can arise in dark field AltPSM layout and routing. Part of the additional difficulty with dark field AltPSM layout arises because phase shapes flanking each feature are not applied in dark field AltPSM; instead, particular phases are directly applied to existing wires and other design features. Therefore, errors in phase coloring and in the phases of adjacent shapes or features may not be readily apparent. Additionally, because wiring (typically defined with dark field AltPSM) usually runs for longer distances than the polysilicon gates and other features that are typically defined with bright field AltPSM, the potential for phase conflicts in dark field AltPSM may be greater than that in bright field AltPSM.

Work by the inventor has demonstrated that traditional wire routing methods and programs often violate the design principles set forth above and produce improper dark field AltPSM phase colorings and layouts. For example, TABLE 1 sets forth the average number of violations of each type found on each of three metallization layers (M1-M3) for macros on two microprocessors. The three types of violations are classified as odd cycles (examples of which were illustrated above), routing restriction violations (e.g., of the design principles set forth above), and illegal pin placements.

TABLE 1

| Average Violations | P1-3 | P4 | P5-8 |
| --- | --- | --- | --- |
| M1 Odd Cycles | 245.3 | 786 | 6.0 |
| M1 Routing Restriction Violations | 749.7 | 4008 | 9.0 |
| M2 Odd Cycles | 107.3 | 0 | 22.5 |
| M2 Routing Restriction Violations | 157 | 13 | 42.0 |
| M3 Odd Cycles | n/a | n/a | 0.75 |
| M3 Routing Restriction Violations | n/a | n/a | 2.5 |
| Illegal Pins | 121.3 | 1450 | 46.5 |

Of the eight cases shown in TABLE 1, the layout and routing for P4 was performed largely by hand. In the case of P4, nearly 15% of the pins were illegally located, and 2495 shapes contained wrong-way wiring (i.e., wiring that is not in the primary wiring direction).

Routing programs according to embodiments of the invention may be implemented in a variety of different programming languages, including interpreted scripting and macro languages and compiled languages, and on a variety of different platforms. For example, routing programs according to embodiments of the invention may be implemented in compiled languages like C and C++, as well as in other languages such as Java and J++ on platforms including general purpose computers, special purpose computers, and any other device capable of executing a routing program. Although the term "implemented" is used, it should be understood that the process of creating a routing program according to embodiments of the invention may include a process of modifying an existing routing program to route so as to avoid the types of phase conflicts identified above with respect to FIGS. 3A-10B. Additionally, routing programs may use any known optimization and/or search algorithms to determine proper routing.

Figure 11:
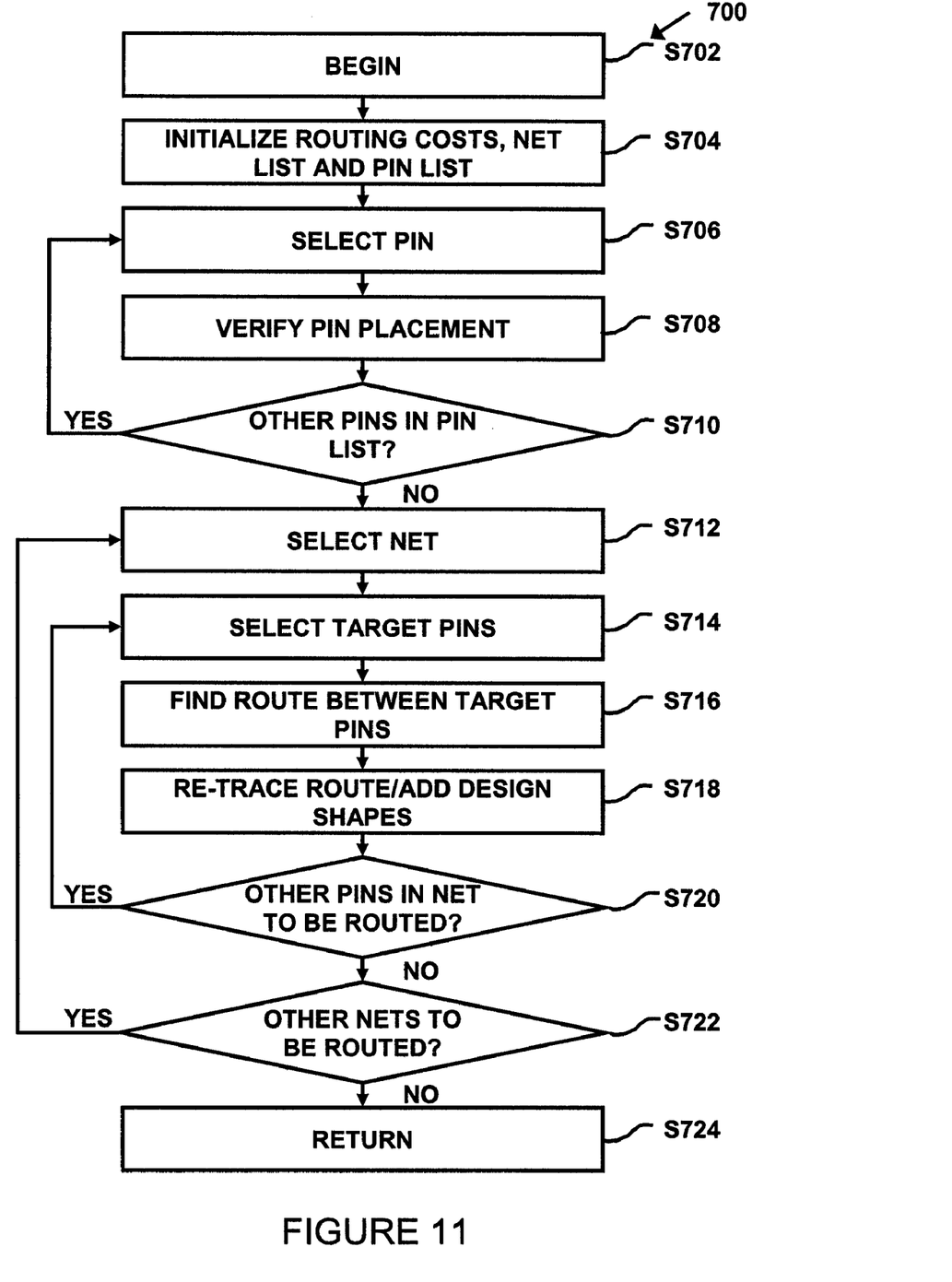
FIG. 11 is a schematic flow diagram of a routing system according to embodiments of the invention.

FIG. 11 is a schematic flow diagram illustrating the general tasks involved in a routing method 700 according to embodiments of the invention. Routing method 700 may be embodied in a routing system according to embodiments of the invention, and generally follows the AltPSM design principles set forth above with respect to bright and dark AltPSM layout.

Routing method 700 begins at S702 and control passes to S704. At S704, the basic information provided to the routing system is initialized, including the list of nets, the list of pins, and the routing cost information used to determine the best routes. Once initialization is complete in S704, method 700 continues with S706. In S706 to S710, method 700 verifies the placement of each pin. Control of method 700 is returned to S706 from S710 for each pin, so that the placement of each can be verified. In the context of embodiments of the present invention, the pin placement verification of S706 to S710 may include checking for the pin spacing problems that were noted above, as well as a number of related tasks that will be explained below in more detail.

Once pin placement verification is complete in S710 (S710:NO), method 700 proceeds with S712, in which a particular net is selected. After a net is selected, target pins are selected in S714. Method 700 then determines a route between the target pins in S716. The routing performed in S716 may be constrained so as to produce phase-correct routing by applying the design principles set forth above. For example, when searching for a route, method 700 may consider only grid spaces that run in the primary wiring direction for dark field AltPSM layout (or, alternatively, if a jog is required, method 700 may consider jogs only of lengths that will avoid phase conflicts). Additionally, in bright field AltPSM layout, method 700 may check for the existence of extra free space for wires that run orthogonal to the primary wiring direction. The routing task of S716 may be limited to a maximum number of routing attempts, so that method 700 does not become "stuck" if no routing solution exists for a set of pins.

If a route is found between two pins, method 700 continues with S718, in which method 700 retraces the route to add design shapes (i.e., the actual shapes of the wires or features that connect the two pins). In the process of retracing, method 700 may also observe the design principles noted above, for example, by marking a space beyond the end of a feature as "blocked" in dark field AltPSM layout, so as to prevent the phase conflict shown in FIG. 6A. Additionally, method 700 may set the width of wires running orthogonal to the primary wiring direction as double the usual width in bright field AltPSM layout.

After retracing is complete in S718, method 700 continues with S720, a decision task. In S720, if there are other pins in the selected net to be routed (S720:YES), control returns to S714. If there are no pins remaining in the selected net to be routed (S720:NO), control passes to S722, another decision task. In S722, if there are other nets to be routed (S722:YES), control returns to S712. If there are no nets remaining to be routed (S722:NO), then control passes to S724, where method 700 terminates and returns. Thus, the routing tasks described above are performed for each pin in each net. As those of skill in the art will realize, routing methods and systems may perform additional tasks, including pin-to-net routing. The tasks described with respect to method 700 are not intended to be an exclusive list.

As one particular example of a layout and routing system according to embodiments of the invention, a phase-correct interactive layout system according to embodiments of the invention was implemented in C++ by modifying an existing interactive layout system. The existing interactive layout system used a gridded multilayer router with a best first search algorithm. One of the differences between the original interactive layout system and the phase-correct layout system was in the types of wiring moves which the system was permitted to explore. The design principles described above for bright and dark field AltPSM were implemented as limitations in the search stage of the algorithm. During the retrace stage, blockages on extra grids were inserted. For a bright field wire which is routed perpendicular to the primary direction, a double width wire was inserted and two side-by-side grid points were blocked at each point along the wire's length. For a dark field wire, a blocked grid point was placed on the grid which lay one grid point beyond each end of a wire in the primary routing direction. In general, the exemplary layout system followed the set of tasks described above with respect to method 700.

Pseudocode for the exemplary layout system follows:
For Each Net
Select an Unrouted Pin.
If two pins have already been connected, only allow pin to net connections (not pin to pin).
Path Trace←empty
Fronts←φ
Lowest Cost Grid←infinity
Add the pin location to the heap of fronts, with cost equal to zero
While front size≠0 and no path exists and iterations<maximum iterations
Front←top of Fronts heap (lowest cost entry)
For each possible neighbor point (there are 6: up, down, left, right, up level, down level)
For Dark Field, only neighbors in the primary wiring direction are considered
Does the Neighbor point exist and is this neighbor point one of the following?
 a. Open: Routing Grid [neighbor]=empty
 b. A target (i.e., a pin for this net): Routing Grid [neighbor]=pin on this net
 c. For Dark Field: additional grid space is available if we are changing levels
Move cost←front cost+cost to move in this direction
If Move cost<Lowest Cost [neighbor point]
For Bright field levels, check for free neighbor grids for wrong-way wires
Accept a move if an additional free grid is available
Add the neighbor grid location to the Fronts heap
Path Trace[neighbor]←direction we came from
If path was found to a target:
Retrace from the target back to the source, adding design shapes
Positions←Target Location
State 0: Position←Direction pointed to by Path Trace[Position]
State←1
State 1: Start of a line segment
If not primary direction and bright field: line with←2×level width
If dark field: Mark a PSM Blockage beyond the line endpoint
Else line width←level width
Starting Point←Position
Routing Grid [Position]←used
If not primary direction and bright field:
Routing Grid[Position's neighbor]←used
Owner[Position]←this net
Position←Direction pointed to by Path Trace[Position]

If New Position is in same direction as previous position (still in a line):
State←2
Else
State←3
State 2: Point along a line segment
Routing Grid [Position]←used
If not primary direction and bright field:
Routing Grid[Position's neighbor]←used
If dark field: Mark a PSM Blockage beyond the line endpoint
Owner[previous point]←this net
Position←Direction pointed to by Path Trace[Position]
If New Position is in same direction as previous position (still in a line):
State←2
Else
State←3
State 3: End of a line segment
If Starting Point and Current Position are equal, create a rectangle in layout
Else Create a line in the layout:
From Starting Point to Current Position
With line width
State←0//Do not get a new point
Release the Fronts heap The exemplary layout system functioned with the aid of certain assumptions, which were as follows: 1. Wires may be placed on adjacent grid points without violating minimum spacing requirements.

2. Wires may end on adjacent grids without violating spacing requirements.

3. Wires may be placed on the grids nearest the boundaries without considering what lies beyond the boundaries, because it is assumed that a "guard ring" of empty space (e.g., at least one grid point) exists around the boundary.

4. Shapes (for bright field AltPSM layout) and spaces (for dark field AltPSM layout) that have minimum width are critical.

5. Shapes (for bright field AltPSM layout) and spaces (for dark field AltPSM layout) that are twice the minimum width (e.g., two grid spaces) are non-critical.

Of course, not all of the above assumptions need be made in layout and routing systems according to embodiments of the invention. In particular, circuit elements beyond the boundaries of a particular layout may also be designed for phase-correct routing, so as to eliminate the need for free space. Additionally, wire jogs may be included in dark field AltPSM layers as was described above.

The exemplary phase correct router implemented four types of layers. A first type of layer included no phase restrictions and allowed wires to be routed vertically and horizontally as desired. A second type of layer was a bright field AltPSM phase correct layer. On the bright field AltPSM phase correct layer, wires or features orthogonal to the primary wiring direction were routed at twice the standard width and blocked two adjacent grid points. A third type of layer was the dark field AltPSM phase correct layer. On the dark field AltPSM phase correct layer, wires were only allowed to run in the primary wiring direction, ends of wires were provided with an extra grid point of adjacent free space, and each pin was checked for legality. A fourth type of layer was similar to the dark field AltPSM phase correct layer, but without additional blocked grid points, and was used to test certain aspects of switchbox routing.

In general, the exemplary routing and layout system described above in pseudocode performed well, leaving very few nets and pins unrouted. Manual changes to the order of nets and pins allowed the system to complete the routing of all pins and nets. Conventional rip-up and re-route algorithms may be added to the exemplary system presented above, as they may allow the exemplary routing and layout system, as well as other systems according to embodiments of the invention, to complete the routing of all pins and nets.

Although the invention has been described with respect to certain exemplary embodiments, modifications and variations may be made within the scope of the appended claims.

The invention claimed is:

1. A system for layout and routing of integrated circuits, comprising:
   a routing module that, when routing wires or features for alternating aperture phase shift masks:
      considers routes for the wires or features essentially only in a primary wiring direction; and
      blocks sufficient free space between the end of a first feature and the beginning of a second feature to avoid phase conflicts between the first feature and the second feature, wherein:
   wires or features running orthogonal to the primary wiring direction do not require phase shapes or phase coloring; and
   the routing module, when routing wires or features for bright field alternating aperture phase shift masks, ensures that wires or features running orthogonally to the primary wiring direction are of non-critical dimensions.

2. The system of claim 1, wherein the alternating aperture phase shift mask is a dark field alternating aperture phase shift mask.

3. The system of claim 1, wherein the routing module defines features on a grid of a uniform basic pitch.

4. The system of claim 3, wherein the routing module routes such that jogs in wires or features:
   extend an even number of spaces along the grid in a non-primary wiring direction; or
   are provided with adequate adjacent free space so as to avoid phase conflicts.

5. The system of claim 1, wherein the routing module satisfies the following wiring principles in a bright field ALtPSM layout:
   the wires or features running in the primary wiring direction are on a uniform pitch and are designated as either critical or non-critical, and
   the wires or features running orthogonal to the primary wiring direction are designated as non-critical.

6. The system of claim 5, wherein the layout avoids a T conflict such that the orthogonal wires or features have dimensions larger than wires or features extending thereto and running in the primary wiring direction.

7. The system of claim 5, wherein the layout avoids an odd-even conflict such that the orthogonal wires or features have a dimension larger than wires or features arranged on opposite sides thereof and running in the primary wiring direction.

8. The system of claim 5, wherein the layout avoids a line end conflict such that an end of a wire or feature running in the primary wiring direction is spaced from an orthogonal wire or feature which is larger in dimension.

9. The system of claim 1, wherein the routing module satisfies the following wiring principles in a dark field AltPSM layout:
   all wires or features run in the primary wiring direction;
   where a wire or feature ends, additional space is inserted beyond an edge thereof and a beginning of another wire or feature; and
   pins are not aligned in the primary wiring direction at a minimum spacing.

* * * * *